INVENTOR.
FREDERICK P. COLLINS
BY
Rosen & Schiller
ATTORNEYS

INVENTOR.
FREDERICK P. COLLINS
BY Rosen & Schiller
ATTORNEYS

INVENTOR.
FREDERICK P. COLLINS
BY Rosen & Schiller
ATTORNEYS

Oct. 25, 1966 F. P. COLLINS 3,281,648

ELECTRIC WAVE FREQUENCY MULTIPLIER

Filed Dec. 17, 1962 5 Sheets-Sheet 4

INVENTOR.
FREDERICK P. COLLINS

BY Rosen & Schiller

ATTORNEYS

INVENTOR.
FREDERICK P. COLLINS
BY Rosen & Schiller
ATTORNEYS 3,281,648

ELECTRIC WAVE FREQUENCY MULTIPLIER

Frederick P. Collins, Natick, Mass., assignor to Microwave Associates, Inc., Burlington, Mass., a corporation of Massachusetts Filed Dec. 17, 1962, Ser. No. 245,245
8 Claims. (Cl. 321—69)

This invention relates in general to electric wave frequency multiplier circuits, and more particularly to solid state harmonic generators which can be used as power sources at microwave frequencies.

A promising approach to the generation of microwave signals involves frequency multiplication through the use of nonlinear impedance (e.g., nonlinear reactance diode) devices in harmonic generator circuits. Particularly advantageous in such circuits are the nonlinear voltage-variable capacitance semiconductor diodes sometimes known as "varactors." Such devices can be driven from transistor power amplifiers, providing all-solid-state microwave sources with significant advantages compared with electron tube oscillators such as klystrons and magnetrons. The major advantages include precise frequency control and all-solid-state reliability.

General objects of this invention are to improve the art of harmonic generators, and to improve the art of solid state microwave power sources. More specific objects of the invention are to provide solid state electric wave harmonic generators having improved efficiency, and increased bandwidth with high efficiency, and which can be realized in lumped or distributed constants circuits. A particular object is to provide such generators which can be used as signal sources at S-band (3,000 mc./sec.), X-band (9,000 mc./sec.) and above, where electron tubes (such as klystrons) have heretofore been dominant, and thereby bring to this frequency region the advantages of low size and weight, low power drain, simplicity of structural design and high reliability which can be afforded by all-solid-state microwave signal sources. Another object of the invention is to provide such generators which can be incorporated into multistage harmonic generators.

In one of its more general aspects, the invention employs an electric circuit for generating from the energy content of an electric wave having a given fundamental frequency an electric wave having a second frequency which is a harmonic of said fundamental frequency, in which a first circuit loop provides resonance at the fundamental frequency, a second circuit loop provides resonance at the second frequency, and a device having a nonlinear characteristic (e.g., a varactor) is connected in series in each loop and provides a common path in both of said loops.

In another of its general aspects, the invention employs an electric circuit for generating from the energy content of an electric wave having a given fundamental frequency an electric wave having a second frequency which is a harmonic higher than the second harmonic of said fundamental frequency, in which a first circuit loop provides resonance at the fundamental frequency, a second circuit loop provides resonance at the second frequency, a third circuit loop provides idler resonance at the second harmonic of the fundamental frequency, and a device having a nonlinear characteristic (e.g., a varactor) is connected in series in each loop and provides a common path in all three of said loops.

Preferably according to the invention, harmonic generator circuits as exemplified above employ, for broadbanding and other advantageous purposes as will hereinafter appear, signal input means including a multi-section band-pass filter centered substantially at the fundamental frequency and including the first circuit loop as one filter section, and signal output means including a multi-section band-pass filter centered substantially at the second frequency and including the second loop as one filter section.

The circuit loops each generally comprise a branch having inductance and capacitance in series, and the nonlinear device may be connected in series in each such branch to provide a common path in each loop. In embodiments of the invention for use in frequency ranges where distributed constants are preferable over lumped constants, the circuit loops may be realized in respective sections of transmission line, and the latter are preferably made of rigid components. Thus, in some embodiments, each transmission line section may comprise an inner conductor electrically shielded by an outer conductor, the inductance of the loop being represented by the length of the inner conductor, and a capacitor may be provided at one end of the inner conductor coupling that end either to an electrode of the nonlinear device or to the outer conductor according to the election of the designer. The capacitance in each branch is preferably variable, or adjustable.

In a preferred embodiment of the invention, the respective input and output filters including respective input and output loops are made in a single rigid structure, including in the same structure all of the variable capacitor elements and mounting means for one or more nonlinear devices; this single rigid structure may also include an idler circuit.

The foregoing and other objects and features of the present invention will become apparent from the following description of certain exemplary embodiments thereof. This description refers to the accompanying drawings wherein:

FIG. 1 schematically illustrates a double-resonant harmonic generator circuit for frequency doubling;

FIG. 2 schematically illustrates an embodiment of the invention employing band-pass input and output filters;

FIG. 3 illustrates partly in block-diagram form and partly schematically a harmonic generator circuit according to the invention for providing an output frequency higher than the second harmonic of the input fundamental frequency;

FIG. 4 schematically illustrates an embodiment of the harmonic generator circuit according to FIG. 3;

FIG. 5 schematically illustrates a multistage harmonic generator chain employing harmonic generator stages according to FIG. 4;

Figures 8, 9, 10:
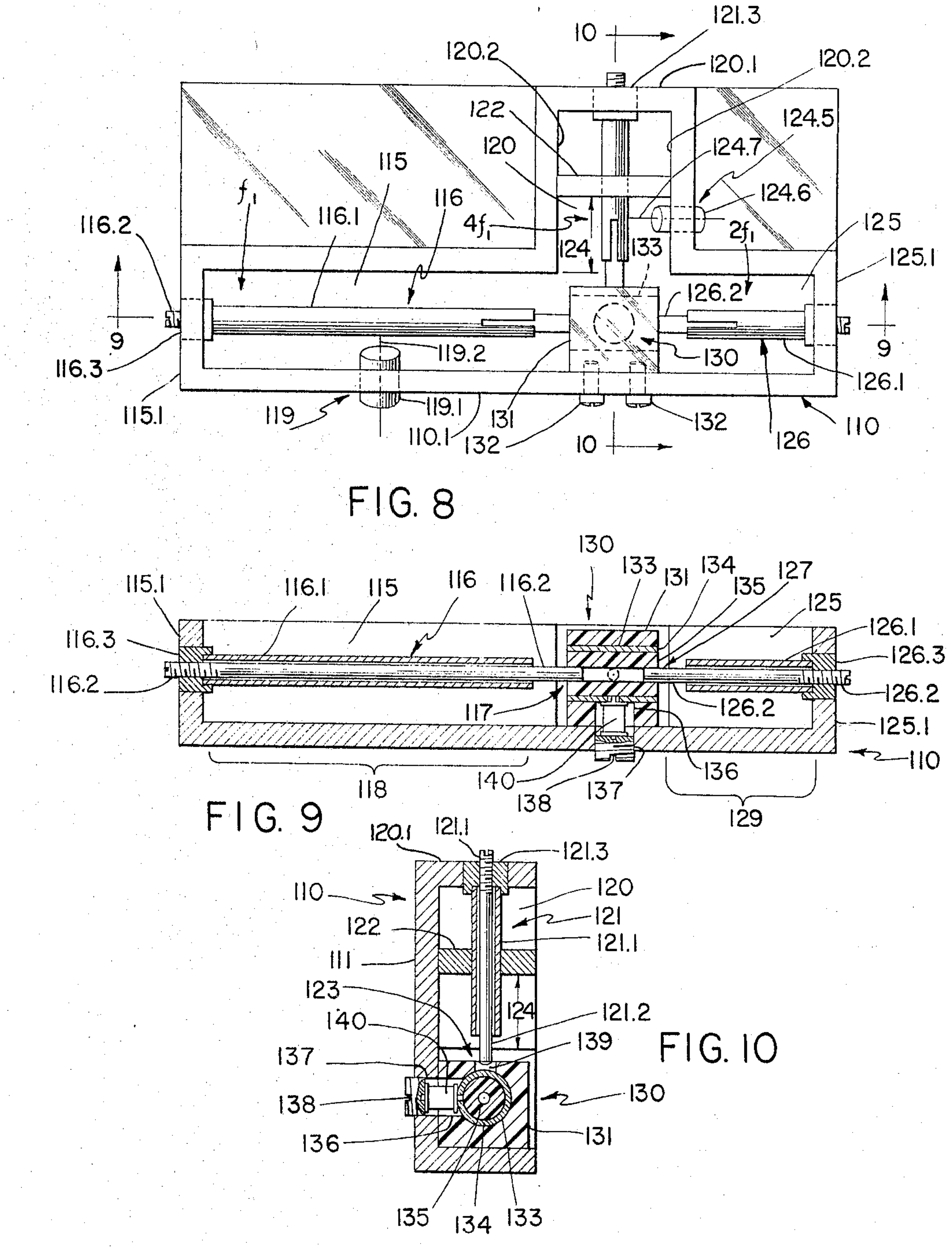
Figures 11, 13:
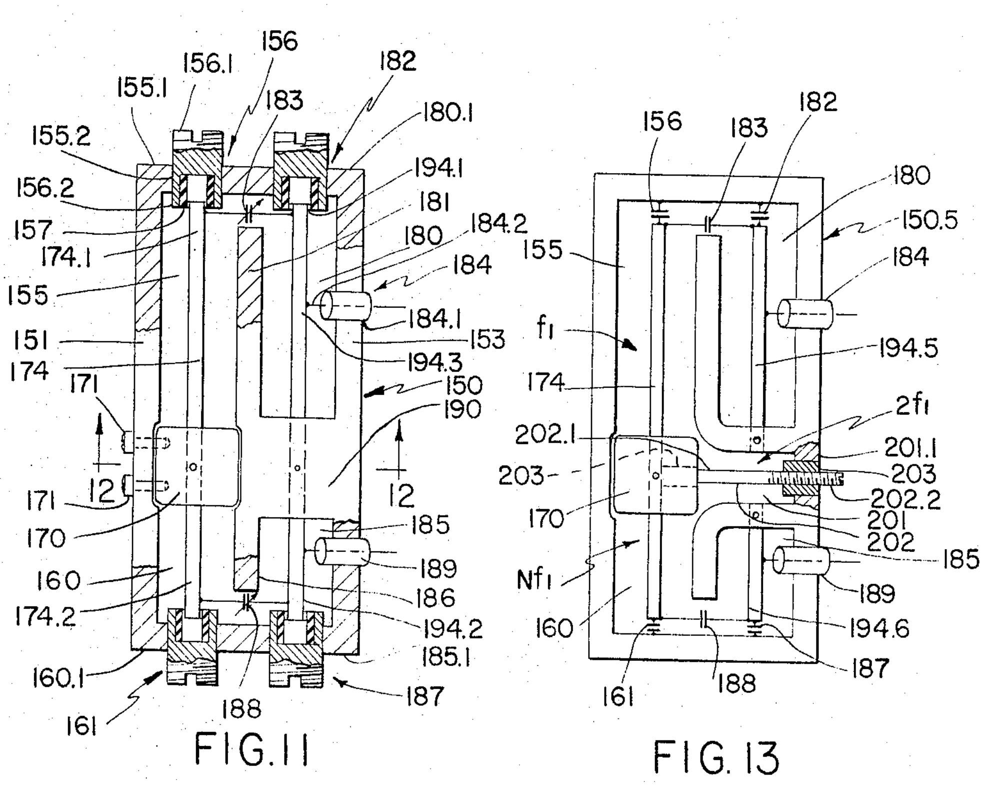
Figure 12:
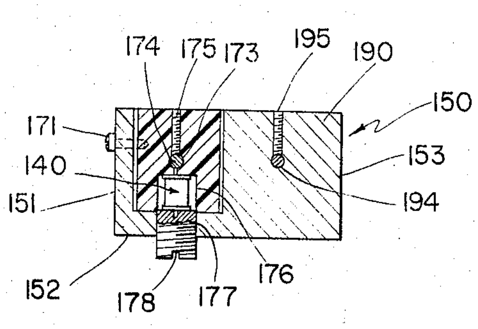

FIGS. 8–10, inclusive, illustrate a harmonic generator realized in part with distributed-constants components;

FIGS. 11 and 12 illustrate another harmonic generator realized in part with distributed-constants type components;

FIG. 13 illustrates a modification of the embodiment of FIGS. 11 and 12; and

Figure 14:
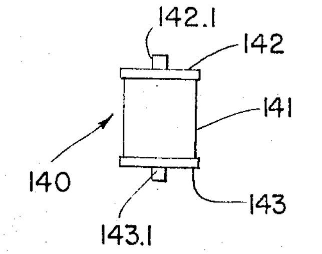

FIG. 14 shows, on an enlarged scale, a component which is illustrated in FIGS. 8–13, inclusive.

Figure 1:
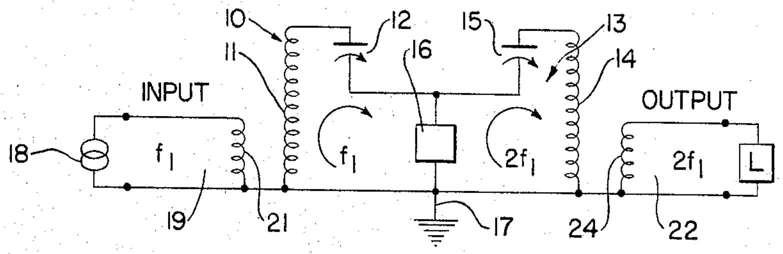

FIG. 1 illustrates a simple double-resonant harmonic generator circuit. A first circuit loop 10 has a branch including an inductor 11 and a variable capacitor 12 connected together in series. A second circuit loop 13 has a branch including an inductor 14 and a variable capacitor 15 connected together in series. A nonlinear impedance device 16, schematically represented by a block in FIG. 1, is connected in series in each of the loops 10 and 13, providing a common circuit path for both loops. The end of each inductor 11 and 14, and one terminal of the device 16, are connected together to ground at 17. The first loop 10 is resonated at a fundamental frequency $f_1$, and the second loop 13 is resonated at the second harmonic $2f_1$ of the fundamental frequency. A source 18 of signals at the fundamental frequency is coupled to the harmonic generator circuit via an input circuit 19, which is, in the present embodiment, inductively coupled to the first loop 10 by mutual inductance between an input inductor 21 and the first loop inductor 11. An output circuit 22 is coupled to the output loop inductor 14 by mutual inductance with an output circuit inductor 24, and a load L is coupled with the output circuit.

The circuit of FIG. 1 is an efficient harmonic generator circuit. The nonlinear impedance device 16 is used as a common circuit element coupling the two resonant loops 10 and 13 together. When tuned, one loop 10 is resonant at the fundamental frequency ($f_1$) and the other loop 13 is resonant at the second harmonic frequency ($2f_1$) thereof. The fundamental frequency ($f_1$) does not pass out via the second loop 13 because the second loop capacitor 15 has a high impedance at $f_1$, and because the second loop inductor 14 would tend to short out any signal at the fundamental frequency. The output second harmonic frequency ($2f_1$) does not pass out via the first loop 10 because, while the first loop capacitor 12 may be large enough to pass $2f_1$, the first inductor 11 presents a high impedance at the second harmonic frequency. If the first and second loop tuning capacitors 12 and 15, respectively, are chosen to have capacitances which are, respectively, small compared with the average capacitance of the device 16, in the case where this device is a nonlinear capacitance semiconductor diode, current at the fundamental frequency ($f_1$) will be largely confined to the first loop 10 and current at the second harmonic frequency ($2f_1$) will be largely confined to the second loop 13.

Using small tuning capacitors 12 and 15, as specified above, the bandwidth of the harmonic generator circuit according to FIG. 1 employing a varactor will be somewhat narrow, approximately 3%. This limitation will appear, for example, when the frequency of operation is shifted. Other reasons will appear from the discussion that follows. To increase the bandwidth, it is possible to design such circuits with larger passive capacitors and smaller inductors. However, this will increase the problem of isolation of the fundamental and harmonic currents. A harmonic generator according to the invention as illustrated in FIG. 2 achieves increased bandwidth without increasing this problem, and has numerous additional advantages, as will be set forth below.

I have placed three frequency doubler circuits according to FIG. 1 in tandem successfully to achieve as much as three watts output at L-band (1140 mc./sec.), with a total multiplication ratio of eight (8) and an overall efficiency of 40%. It should be noted that, in the circuit of FIG. 1, the nonlinear impedance device 16 is directly connected on common in both resonant loops 10 and 13; there is no need for isolation of the loop branches 11, 12 and 14, 15, respectively, from the nonlinear device 16 by traps, or the like, as is characteristic of some prior circuits, so that such causes of reduced bandwidth are eliminated in FIG. 1. This feature is retained in the other embodiments illustrated and to be described below.

Figure 2:
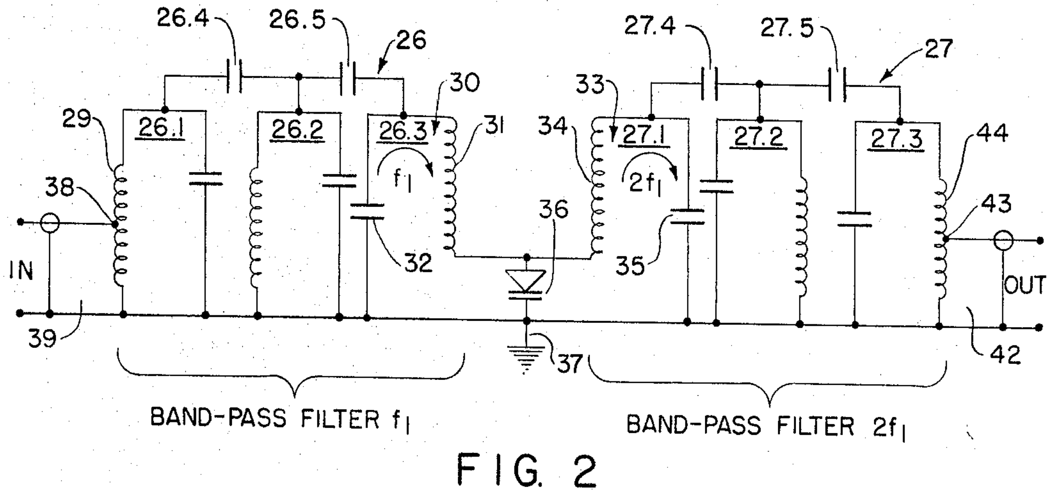

FIG. 2 illustrates a double-resonant harmonic generator circuit (26, 27) which employs the basic principles of the circuit of FIG. 1, but further employs band-pass filters 26 and 27 at the input and output, respectively. A first circuit loop 30 has a branch including an inductor 31 and a capacitor 32 in series, and a second circuit loop 33 has a branch including an inductor 34 and a capacitor 35 in series. A semiconductor diode 36, which may be a varactor, occupies the circuit position of the device 16 in FIG. 1, and is similarly connected in series with each of these two branches providing a common circuit path for both loops, and one side of the diode and one end of each branch are all connected together to ground at 37.

The input band-pass filter 26 comprises three T-sections 26.1, 26.2 and 26.3, and the first loop 30 is the third T-section, the three sections being coupled together via capacitors 26.4 and 26.5, respectively. The input circuit 39 is connected at one side to ground 37 and at the other side to an intermediate point 38 on the introductor 29 of the first T-section 26.1. The input band-pass filter 26 is tuned to have its pass-band centered substantially at the fundamental frequency $f_1$.

The output band-pass filter 27 comprises three T-sections 27.1, 27.2 and 27.3, and the second loop 33 is the first section 27.1, the three sections being coupled together via capacitors 27.4 and 27.5, respectively. The output circuit 42 is connected at one side to ground 37 and at the other side to an intermediate point 43 on the inductor 44 of the third T-section 27.3. The output band-pass filter 27 is tuned to have its pass-band centered substantially at the second-harmonic frequency $2f_1$.

The use of band-pass filters 26 and 27 at the input and output, and including the first and second circuit loops 30 and 33, respectively, of the harmonic generator has a number of beneficial effects. The filters provide a high degree of impedance uniformity over their respective pass-bands, and this is of particular value when the nonlinear device employed has a nonlinear reactance characteristic which is variable in accordance with the applied voltage. A semiconductor diode of the varactor type has a nonlinear capacitance which varies in magnitude dependent upon the voltage applied across the diode. The filters not only provide stable input impedance over a wider frequency band, but also provide stable output impedance over a wider frequency band. Thus, the input filter 26 contributes greater uniformity of the voltage applied across the diode 36, and the output filter 27 reduces the amount of energy reflected back to the diode, all over a wider operating frequency band. The output filter 27, being a band-pass filter, will also substantially prevent signals at frequencies outside the pass-band, particularly energy at the fundamental frequency $f_1$, from passing to a succeeding multiplier stage.

Figure 4:
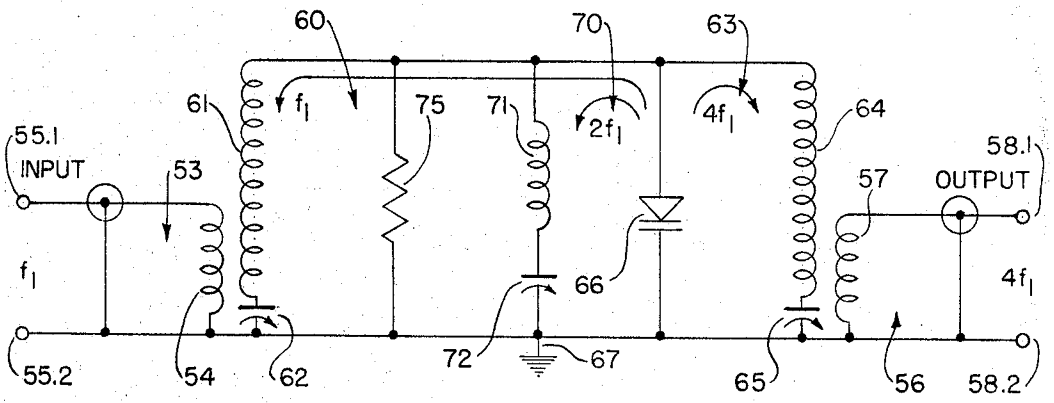

The utility of the band-pass filters for broad-banding the harmonic generator circuits of the present invention will be better appreciated from a consideration of a phenomenon, relating to semiconductor diodes having a voltage-variable nonlinear capacitance characteristic, which may be termed "dynamic detuning." This term means the variation in effective capacitance of a varactor as the A.C. driving voltage is varied. The varactor, as a nonlinear capacitance, has different dynamic behavior for small and large signals. As the drive power is varied, a harmonic generator circuit employing a varactor shows variations in its resonant frequency, and also variations in the resistive component of its dynamic impedance. The character of such variations depends upon the manner in which the varactor is biased. In a harmonic generator circuit, the varactor will be self-biased when the direct current flow through it is blocked by a capacitor. This may be modified by a resistive shunt across the varactor (usually a few thousand ohms); such a modification is illustrated in FIG. 4 and will be described below. Fixed bias may also be used where a power supply provides the desired mean-value of reverse voltage through a suitable bypass, R-F choke, or resistor, which blocks R-F excitation from the power supply.

One adverse effect of dynamic detuning is a discontinuous variation in output power as the input power or input frequency is varied continuously. Another adverse effect which can sometimes appear is a sort of hysteresis effect. Qualitatively this can be explained by the statement that the quiescent circuit is so badly out of tune at a low drive level that it cannot become properly excited, yet once the circuit is set into oscillation (as with a stronger signal) its resonant frequency changes and it may then be properly tuned and remain excited, even for a relatively weak drive signal level. These adverse effects may be eliminated over a broad band by proper circuit adjustments. The use of band-pass filters 26 and 27 contributes greatly to the ease with which these adverse effects may be eliminated. Clearly, the filters may each employ any desired number of sections, to achieve the desired broad-band stability.

Figure 3:
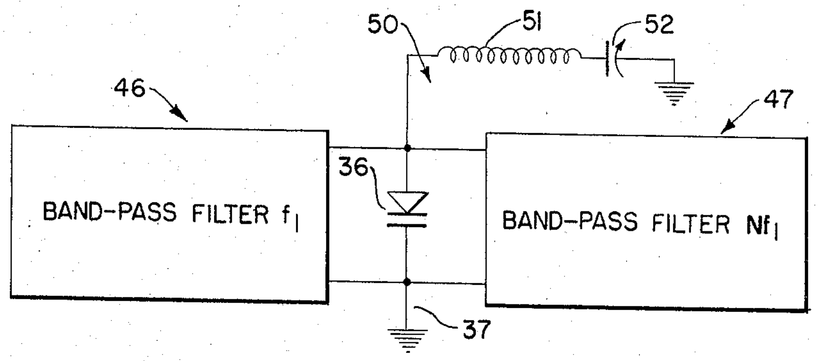

Stability of operation can be further enhanced by employing harmonic generators of larger harmonic ratio than 2:1. FIG. 3 illustrates a modification of the harmonic generator of FIG. 2 which introduces the possibility of achieving a harmonic ratio of 3:1 or greater. Referring for a moment to FIG. 2, it will be recalled that the input band-pass filter 26 includes the first loop 30, and that the output band-pass filter 27 includes the second loop 33. In FIG. 3, the block 46 represents the equivalent of the input band-pass filter 26, while the block 47 represents the equivalent of the output band-pass filter 27, of FIG. 2, the latter being tuned, however, to a harmonic higher than the second harmonic of the fundamental frequency, as will presently be explained. The diode 36 and ground connection 37 are the same in FIGS. 2 and 3.

A third circuit loop 50, having a branch including an inductor 51 and a variable capacitor 52 connected together in series with the diode 36, is resonated at the second harmonic ($2f_1$) of the fundamental frequency. No output is taken from this third loop; it functions as an idler circuit for the second harmonic frequency energy which appears across the varactor during operation. The output band-pass filter 47 (including the second circuit loop) is tuned to the desired harmonic $Nf_1$ above the second harmonic of the fundamental frequency, which becomes the output frequency. The output frequency can easily be chosen to be the third or the fourth harmonic by this arrangement.

Thus, by including an idler circuit for the second harmonic, as a third circuit loop, and providing band-pass filters for the fundamental and the output harmonic frequencies, respectively, a triple-resonant harmonic generator circuit is provided which can readily function as a frequency tripler or quadrupler, as desired. This has not only the obvious advantage of providing greater frequency multiplication in a single stage, but also the not so obvious advantage that, by reducing the over-all line-length of a frequency multiplier chain, as well as the number of filters involved, it reduces the chances that circuit loops may exist in which impedance conditions may simultaneously be found which favors oscillation at an undesired frequency which is also harmonically related to the fundamental frequency or to the output frequency, or to one of the intermediate harmonic frequencies.

Such undesired oscillations may be traced to parametric instabilities of various types, for example:

(a) Subharmonic or degenerate;
(b) Lower sideband;
(c) Second order lower sideband;
(d) Second order degenerate.

These instabilities can be avoided by precautions as follows:

(1) Filters and line lengths should be designed so that there are no high-impedance circuit resonances near a frequency equal to one-half the fundamental, or driving, frequency;

(2) Multiple circuit resonances should be avoided which give high circuit impedance at two frequencies whose sum is the input fundamental frequency;

(3) When a varactor is used, and is strongly pumped, it is desirable to use relatively tight coupling to the input and output lines.

The use of frequency multipliers of larger harmonic ratio than doublers, and consequent reduction of transmission lines between stages in a multi-stage frequency multiplier chain, together with the use of band-pass filters at the input and output (and between stages, as will hereinafter appear) aids greatly in eliminating, or at least significantly reducing, the abovementioned parametric instabilities. As has already been mentioned, the use of band-pass filters at the input and output of a frequency-multiplier stage also aids in reducing the adverse effects of dynamic detuning.

FIG. 4 illustrates a frequency quadrupler circuit incorporating a number of the novel features described above. This is a triple-resonant circuit in which the fundamental ($f_1$), the second harmonic ($2f_1$) and the fourth harmonic ($4f_1$) are all resonant frequencies. FIG. 4 shows the elementary circuit, without band-pass filters at the input and the output; these latter will be described below in connection with FIG. 5.

In FIG. 4, a semiconductor diode 66 having a nonlinear voltage-variable capacitance characteristic (e.g., a varactor) is coupled in series with the three separate circuit loops, as follows. A first circuit loop 60 has a branch including an inductor 61 and a variable capacitor 62 connected together in series; this is the input loop, and is resonated at the fundamental frequency $f_1$. A second circuit loop 63 has a branch including an inductor 64 and a variable capacitor 65 connected together in series; this is the output loop, and is resonated at the output fourth harmonic frequency $4f_1$. A third circuit loop 70 has a branch including an inductor 71 and a variable capacitor 72 connected together in series; this is the idler loop, and is resonated at the second harmonic frequency $2f_1$. A common ground is provided at 67. A resistor 75 is connected across all three of the above-described branches and the diode 66; as is mentioned above in the discussion of dynamic detuning, this resistor modifies the self-biasing of the diode 66, and may have a value of a few thousand (e.g., approximately 30,000) ohms. The resistor 75 thus gives a degree of stabilization in bias and improves the broadband characteristics of the circuit of FIG. 4.

An input circuit 53 for the fundamental frequency $f_1$ may be inductively coupled to the first loop 60 by mutual inductance between an input inductor 54 and the first loop inductor 61. The input terminals 55.1 and 55.2 may be coupled to a source (not shown) of oscillations at the fundamental frequency. An output circuit 56 may be coupled to the output loop inductor 64 by mutual inductance with an output circuit inductor 57, and a load (not shown) may be coupled to the output circuit at the output terminals 58.1 and 58.2. As is mentioned above, when the diode 66 is a varactor, or the like, if it is to be strongly driven (or pumped), it is desirable to use relatively tight coupling between the input circuit 53 and the first circuit loop 60, and between the output circuit 56 and the second circuit loop 63. Alternatively, the input and output circuits can be directly connected to the input and output circuit inductors 61 and 64, respectively, in the manner illustrated in FIG. 2, and to be described in connection with FIG. 5.

Figure 5:
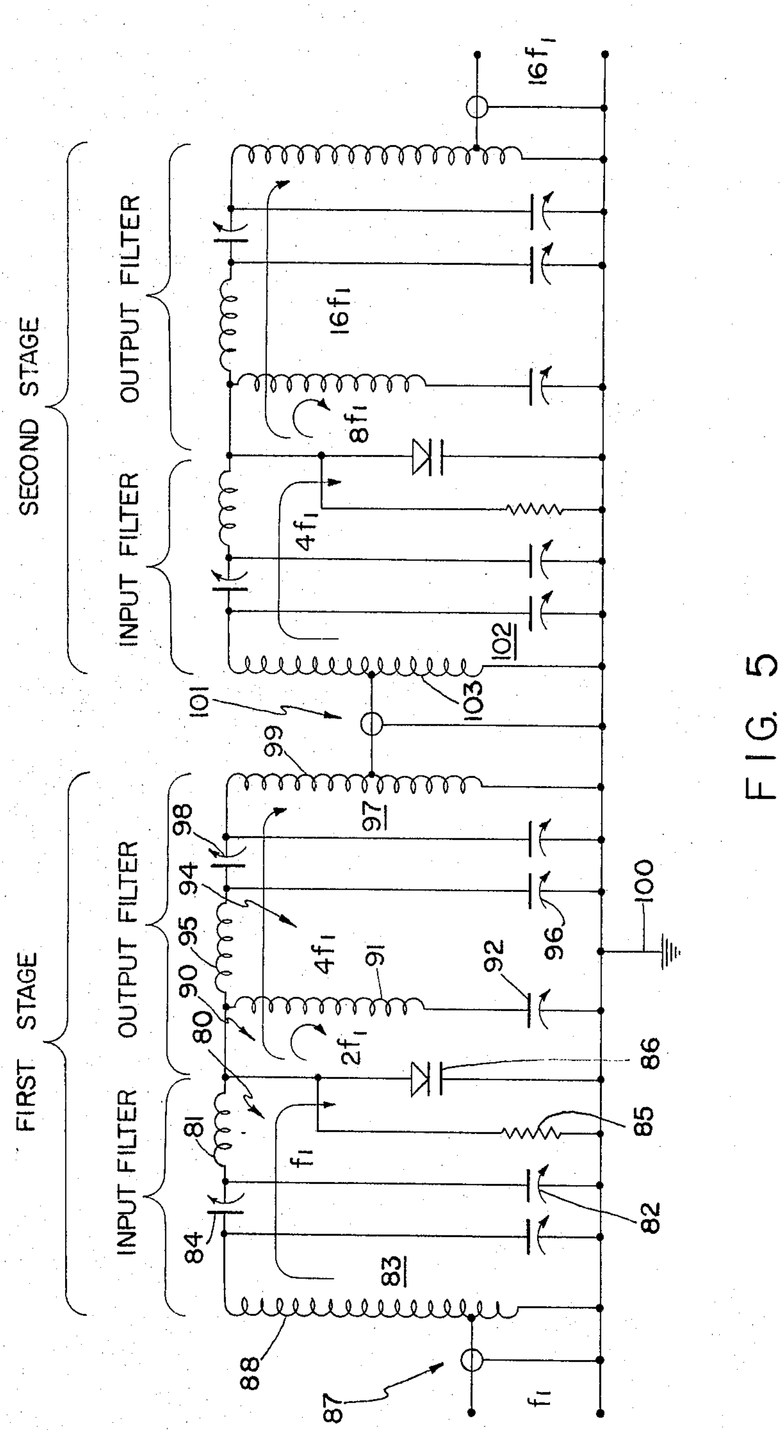

FIG. 5 illustrates a two-stage frequency multiplier chain in which each stage is a triple-resonant frequency quadrupler similar to that of FIG. 4 but including input and output bandpass filters. The first stage, and its interconnection with the second stage will be described in detail; the second stage being similar to the first stage, will not be described in detail.

The first stage employs a semiconductor diode 86 having a nonlinear voltage-variable capacitance characteristic (e.g., a varactor) shunted by a resistor 85. The input circuit loop 80 has a branch including an inductor 81 and a variable capacitor 82 connected together in series with the diode 86, and preceded by a filter T-section 83 to which it is coupled by a capacitor 84. The input circuit 87 is connected directly across a portion of the inductor 88 of the input filter T-section 83, as in FIG. 2. The input filter T-section 83 and the input circuit loop 80 together constitute an input filter resonant at the input fundamental frequency $f_1$. The resistor 85 has the same function in FIG. 5 as the resistor 75 in FIG. 4.

The idler circuit loop 90 has a branch including an inductor 91 and a variable capacitor 92 connected in series with the diode 86. This loop is resonated at the second harmonic $2f_1$ of the fundamental frequency.

The output circuit loop 94 has a branch including an inductor 95 and a variable capacitor 96 connected in series with the diode 86. An output filter T-section 97 is coupled to the output circuit loop via a capacitor 98. The output circuit loop 94 and the output filter T-section 97 together constitute an output filter resonant at the output fourth harmonic frequency $4f_1$.

The second stage in FIG. 5 is similar in all its circuit functions to the first stage, except that in the second stage the input frequency is $4f_1$, the idler frequency is $8f_1$ and the output frequency is $16f_1$. A short section of transmission line 101 is connected directly between a portion of the inductor 99 of the output filter T-section 97 of the first stage and a portion of the inductor 103 of the input filter T-section 102 of the second stage. A common ground 100 is provided for the entire frequency multiplier chain.

Clearly, if desired, additional input and/or output filter sections may be added to the first stage, the second stage, or both stages, in FIG. 5. For example, in a frequency multiplier chain not including all of the interstage bandpass filters according to FIG. 5, in which the input fundamental frequency was 64 mc./sec., and the desired output frequency was 1024 mc./sec. ($16f_1$), in placing the two stages in tandem it was noted that there were outputs at the 15th and 17th harmonics, which were only 10 db weaker than the desired 16th harmonic at 1024 mc./sec. The arrangement shown in FIG. 5 reduced the undesired harmonics to negligible values.

Figure 6:
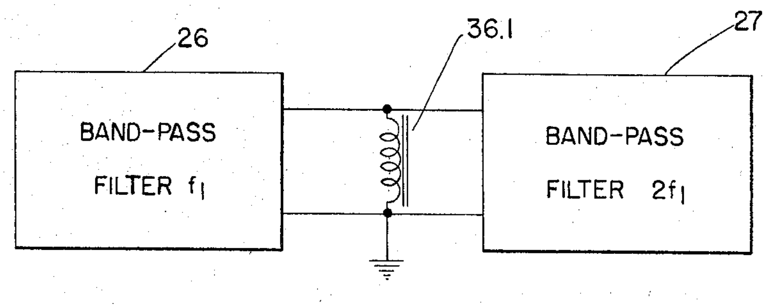
FIG. 6 illustrates partly in block-diagram form and partly schematically a harmonic generator circuit similar to that of FIG. 2 but employing a nonlinear reactance.
Figure 7:
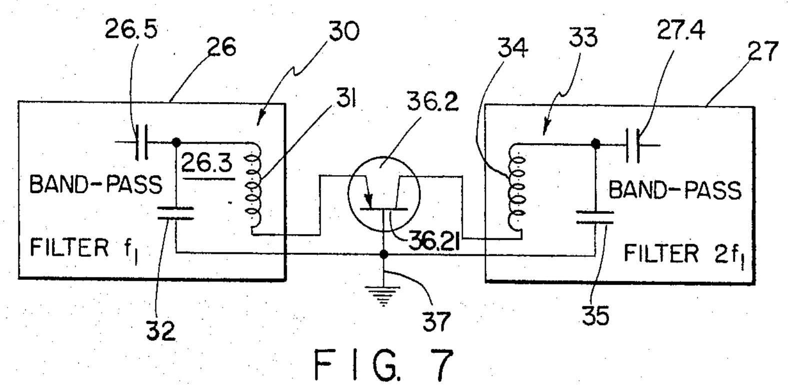
FIG. 7 illustrates partly in block-diagram form and partly schematically a harmonic generator circuit similar to that of FIG. 2 but employing a transistor as the nonlinear device.

In FIG. 6 a nonlinear inductor 36.1 is substituted for the diode 36 of FIG. 2. The input and output filters 26 and 27, respectively, are the same in FIGS. 2 and 6. In FIG. 7 a transistor 36.2 is substituted for the diode 36 in FIG. 2. Here the transistor base 36.21 is connected to ground 37, while the emitter and collector are respectively connected in the input circuit loop 30 and output circuit loop 33, respectively.

The harmonic generator circuits thus far described require no components resembling transmission lines, but rather can be made throughout of lumped-constant circuit elements. At 1000 mc./sec., the resonant circuits may conveniently be made of simple strap-loops ¼ inch wide and 5 pf. air variable condensers of a miniature type. For generating harmonics from 1024 mc./sec. to double, triple or quadruple that frequency, for example, distributed-constants circuits, as illustrated by way of example in FIGS. 8–13, are preferred.

FIGS. 8, 9 and 10 show a distributed-constants harmonic generator circuit, suitable for use, for example, as a frequency quadrupler from 1024–4096 mc./sec. A rigid body 110, made of an electrically conductive material such as brass or aluminum, has walls defining first, second and third elongated passages 115, 120 and 125, respectively. Referring to FIG. 9, it will be appreciated that, in practice, a cover (not shown) may be provided, totally enclosing each passage. These passages all meet, at one end, in a common region 130; each passage is closed at the other end. A block 131 of electrically-insulating material is disposed in the common region. This block may be made, for example, of nylon, and is held in place by screws 132 of the same or another insulating material passing through holes in a wall 110.1 of the rigid body 110. The first and third passages 115 and 125 are collinearly and axially aligned, and the block 131 has a cylindrical bore 133 through it, the bore also being axially aligned with these two passages and lying between their ends confronting the common region 130. An electrically-conductive sleeve 134 is fitted within the bore 133, and an electrically-insulating sleeve 135 is fitted within the conductive sleeve.

A rigid elongated electrical conductor 116, comprised of an outer tubular member 116.1 and a rod member 116.2 slidably fitted within it, is supported within the first elongated passage 115. An annular support member 116.3 of electrically conductive material, is supported in a bore in the end wall 115.1 of this passage, and in turn holds one end of the tubular member 116.1, so that the latter is held rigidly in place coaxially with the bore 133 in the block 131. The annular support member 116.3 is internally threaded to receive the threaded portion of the rod member 116.2, at one end thereof. The other end of the rod member 16.2, at the common region 130, fits telescopically within the electrically insulating sleeve 135 in the block 131.

Electrically, the walls defining the first passage 115 and the conductor 116 comprise a section of transmission line 118 closed at one end and open at the other end adjacent the common region 130. In this line section, the conductor 116 provides distributed inductance. The end of the rod member 116.2 within the insulating sleeve 135 and the portion of the electrically-conductive sleeve 134 confronting that end across the insulating sleeve constitute a variable capacitor 117. The capacitor 117 is adjustable by turning the rod member 116.2 in the threaded annular support member 116.3. The transmission line section 118 may be deemed to act, electrically, as a stub in a TEM (coaxial) mode, it is tuned to the input fundamental frequency $f_1$, and constitutes the equivalent of the branch of the input circuit loop having inductance and capacitance in series, equivalent, for example, to the inductor 11 and the capacitor 12 in FIG. 1.

Referring to FIGS. 9 and 10, the block 131 has a second bore 136 in it, on an axis transverse to the axis of the first bore 133 and in register with an internally-threaded bore 137 in the bottom wall 111 of the rigid body 110. A set screw 138 fits within the threaded bore 137, and holds a nonlinear impedance device 140 in place in the bore 136 in the block 131, between the electrically-conductive sleeve 134 and the set screw 138.

The device 140 may be a semiconductor diode having a nonlinear voltage-variable capacitance characteristic, and its outside appearance is illustrated on an enlarged scale in FIG. 14. A cylindrical housing 141, which may be made of any suitable electrically insulating material, such as a ceramic, has two electrodes or terminals 142 and 143, respectively, affixed one to each end. The terminals are flat and generally disc shaped, and each is fitted with an axially-located projection 142.1 and 143.1, respectively. The electrically-conductive sleeve 134 in the block 131 has a laterally-located hole for receiving one of these projections, and the set screw 138 has at its inner end an axially-located hole for receiving the second of these projections. In this manner the device 140 is located and held in place, both electrically and mechanically, between the rigid body 110 and the electrically-conductive sleeve 134.

It will be appreciated that the device 140 is connected in series with a branch of the input circuit loop 118 which has inductance 116 and capacitance 117 in series, and that electrically this arrangement is similar to the arrangements described above and illustrated in FIGS. 1–5, inclusive. Similarly, the second and third passages 120 and 125, and the parts in them, cooperate with the block 131 and the device 140 to function, respectively, as an output circuit loop for the fourth harmonic $4f_1$, and a circuit loop for the idler frequency $2f_1$, as will now be explained. The input transmission line section is fitted with input terminal means 119, illustrated schematically in FIG. 8 as a coaxial input terminal having an outer conductor 119.1 grounded to the rigid body 110 and an inner conductor 119.2 connected directly to the tubular member 116.1 at a desirable input impedance point.

The third passage 125 has a rigid inner conductor 126 made in two telescopically interfitting parts 126.1 and 126.2, of which the outer part 126.1 is held at one end in a threaded annular support member 126.3, which in turn is mounted in the end wall 125.1 of the passage. The inner rod-like conductor member 126.2 is threaded at one end for engagement with the annular support member, and at its free end fits within one end of the insulating sleeve 135 in the block 131. It will be appreciated that these parts constitute a transmission line section 129, having distributed inductance, which may be represented by the inner conductor 126, and a variable capacitor 127 formed between the free end of the rod member 126.2 and the portion of the electrically conductive sleeve 134 which confronts the rod member across the insulating sleeve 135, and that these components are coupled in a loop in series with the nonlinear impedance device 140. The transmission line section 129 of the third passage 125 is tuned to the second harmonic $2f_1$ of the input fundamental frequency. It functions as an idler circuit.

Referring to FIG. 10, the block 131 is provided with a small bore 139 in the side facing the second passage 120, to accommodate the free end of the rod member 121.2 of a rigid inner conductor 121 having an outer elongated part 121.1 in which the rod member is telescopically and slidably fitted. An internally-threaded annular support 121.3 is supported in the end wall 120.1 and in turn supports the outer part 121.1 of the inner conductor 121, and the inner rod-like part 121.2 is threaded at its outer end for axial adjustment in the bore 139 in the block 131. A slidable shorting bar 122 is fitted in the passage 120 in contact with both the outer side walls 120.2 and the outer part 121.1 of the inner conductor. This shorting bar adjusts the length of a transmission line section 124 in the second passage. By means of the shorting bar 122 and the threaded engagement of the rod member 122.2 in the support member 121.3, both the inductance (effective length of the conductor 121) and the capacitance (capacitor 123 between the free end of the rod member 121.2 and the conductive sleeve 134 in the block 131) of the transmission line section 124 can be tuned to resonance at an output harmonic frequency higher than the second harmonic $2f_1$ of the input fundamental frequency. In the embodiment illustrated in FIGS. 8–10, inclusive, the fourth harmonic $4f_1$ is chosen as the output frequency. At this frequency, the capacitance required will be relatively small, and the mere juxtaposition of the free end of the rod member 121.2 and a side of the conductive sleeve 134 constitutes the required capacitor 123.

It will be appreciated that the inductance and capacitance of the circuit loop provided by the transmission line section 124 are also connected in a loop in series with the nonlinear impedance device 140. An output connection 124.5 is provided from this transmission line section, represented schematically by a coaxial terminal having an outer conductor 124.6 grounded to a wall 120.2 of the rigid body 110, and an inner conductor 124.7 connected directly to the inner conductor sleeve member 121.1 at a desirable impedance point.

The rigid body 110 provides a common ground for one side of the nonlinear impedance device 140 and for one end of the distributed inductor of each transmission line section 118, 129 and 124, respectively. In this respect, the electrical circuit employed in the embodiment of FIGS. 8–10, inclusive, resembles the circuit of FIG. 1. An arrangement in which the rigid body provides a common ground for one side of the capacitor of each circuit loop and for one side of the device 140, as, for example, in the circuit of FIG. 4 or FIG. 5, is shown in FIGS. 11 and 12. The embodiment of these figures includes input and output filter sections in the same rigid structure.

In FIGS. 11 and 12, a rigid body 150, made of an electrically conductive material such as brass or aluminum, has first and second passages 155 and 160, respectively, which are collinear and are separated only by an electrically nonconductive block 170. The block 170 is held in place in a slightly wider region between the confronting open ends of these two passages 155 and 160, by means of nonconductive bolts 171 passing through a side wall 151 of the rigid body 150. As is shown in FIG. 12, the block 170 has an aperture 176 in register with an internally-threaded aperture 177 in the bottom wall 152 of the rigid body 150, and a set screw 178 holds a nonlinear impedance device 140 in the aperture 176 in the block. A second somewhat smaller bore 173 passes through the block in the direction of the passages 155 and 160, and a stiff elongated electrically conductive member, such as a rod 174, passes through this bore and is held in place therein by a set screw 175. The nonlinear impedance device 140 makes electrical contact at one terminal (e.g., terminal 143) with the rigid body 150 via the set screw 178, and at the other terminal (142) with the rod 174.

The rod 174 extends axially within each of the two collinear passages 155 and 160. At one end 174.1 the rod confronts the end wall 155.1 of the first passage 155, and at the other end 174.2 the rod confronts the end wall 160.1 of the second passage 160. Each end wall 155.1 and 160.1 is fitted with a variable capacitor 156 and 161, respectively. Since these structures are identical, only one of them, capacitor 156 in the end wall of the first passage 155, will be described in detail. An externally-threaded set screw 156.1 engages an internally-threaded bore 155.2 in the end wall 155.1. The set screw is axially bored out from the interior end 156.2 about half way through. An electrically-insulating sleeve 157 lines the bore. The confronting end 174.1 of the rod 174 fits telescopically within the sleeve 157. The variable capacitor 156 is constituted by the portions of the rod end 174.1 and the set screw end 156.2 which confront each other across the sleeve 157.

It will now be apparent that the walls of the first passage 155 and the portion of the rod 174 therein constitute a first transmission line section having inductance (the line section) and variable capacitance 156 in a loop in series with the nonlinear impedance device 140. Similarly, the walls of the second passage 160 and the portion of the rod 174 therein constitute a second transmission line section having inductance (the line section) and variable capacitance 161 in a loop in series with the nonlinear impedance device 140. It will also be apparent that in this embodiment of the invention the rigid body 150 affords a common ground for one terminal of the device 140 and for one side of each of the capacitors 156 and 161, respectively, and that, accordingly, this embodiment is in this respect electrically similar to the embodiment of FIG. 2.

The first transmission line section is resonated to the fundamental frequency $f_1$, while the second transmission line section is resonated to the second harmonic $2f_1$ thereof. The rigid body includes third and fourth additional passages 180 and 185, respectively, which are collinearly arranged, respectively, beside the first and second passages 155 and 160. A barrier 190 of the material of the rigid body 150 separates the third and fourth passages from each other. This barrier is arranged in the same transverse region as the electrically insulating block 170, so that the third passage 180 is approximately the same length as the first passage 155 and the fourth passage 185 is approximately the same length as the second passage 160. The first and third passages are separated by a common wall 181; and the second and fourth passages are separated by a common wall 186. An elongated conductor 194 passes through a bore in the barrier 190, being held in place by a set screw 195, and extends axially within the third and fourth passages 180 and 185, respectively. A third variable capacitor 182, structurally similar to the first variable capacitor 156, couples one end 194.1 of the rod 194 to the end wall 180.1 of the third passage 180. A fourth variable capacitor 187 of similar structure couples the remaining end 194.2 of the rod 194 to the end wall 185.1 of the fourth passage 185.

The walls of the third passage 180 and the portion of the rod 194 therein constitute a third transmission line section having inductance (the line section) and capacitance 182 each connected at one end to ground at the rigid body 150. A fifth variable capacitor 183 is connected at one side to their common junction, which is at the end 194.1 of the rod 194 "connected" to the third capacitor 182, and at the other side to the common junction between the distributed inductance and the variable capacitor 156 of the first line section of the first passage 155. Referring again to FIG. 2, it is thus apparent that the third passage 180 and the above-described elements associated with it constitute the electrical equivalent of a filter T-section such as the first T-section 26.1 in FIG. 2, and that the fifth capacitor 183 in FIG. 9 is the equivalent of a coupling capacitor such as 26.4 in FIG. 2. FIG. 11 shows only one filter T-section, which functions as a first section of an input band-pass filter; accordingly, the line section of the third passage 180 is tuned to resonate substantially at the fundamental frequency $f_1$. Coaxial input terminal means 184, comprising an outer conductor 184.1 passing through and electrically connected to a wall 153 of the rigid body 150 and an inner conductor 184.2 connected to an intermediate point 194.3 on the portion of the rod 194 in the third passage 180, are provided for this first input filter section; these means, also, are the electrical equivalent of the input means 38, 39 shown in FIG. 2. It will be understood that additional filter T-sections can be incorporated between the first section (the third passage 180) and the final section (the first passage 155), if desired, in a structure according to FIG. 11.

It will now be apparent that the fourth passage 185 and the above-described elements associated with it will, when resonated to the second harmonic frequency $2f_1$, constitute an output filter T-section for the harmonic generator of FIG. 11. This T-section is coupled via a sixth variable capacitor 188 to the second transmission line section of the second passage 160, and has signal output means 189 structurally similar to the signal input means 184 and electrically similar to the signal output means 42, 43 of FIG. 2. Again, it will be understood that additional filter T-sections can be incorporated in the output side of a structure according to FIG. 11, if desired.

FIG. 13 illustrates another embodiment of the invention employing the techniques of the embodiment of FIGS. 11 and 12 to provide a harmonic generator, for example a frequency quadrupler, having input and output band-pass filters and an idler circuit, all in a single rigid structure. In FIG. 13, a rigid body of 150.5 is similar in all respects to the rigid body 150 of FIG. 11, except that a fifth passage 201 is provided in the barrier 190, and an elongated conductor 202 is axially disposed in this passage, to provide a fifth transmission line section which is resonated at the second harmonic frequency $2f_1$ of the input fundamental frequency. All other elements in FIG. 13, including electrical circuit components and parameters, are the same as in FIGS. 11 and 12, except that the output is $Nf_1$ where "N" is greater than 2; for example, the output sections 160 and 185 may be resonated at the fourth harmonic $4f_1$. The block 170 has an additional bore 203 transverse to the rod 174, and a first end 202.1 of the conductor 202 fits telescopically within this bore. The other end 202.2 of the conductor 202 is threaded and is supported in an internally-threaded annular support 203 which is mounted in the end wall 201.1 of the fifth passagge 201. The conductor 202 is thus adjustable to couple capacitively with a terminal (142) of the nonlinear impedance device 140 in the block 170.

Thus, in a single rigid structure, there are provided input filter sections 180 and 155 resonated at the input frequency $f_1$, an idler circuit 201 resonated at the second harmonic frequency $2f_1$, and output filter sections 160 and 185 resonated at the desired output harmonic frequency (e.g., $4f_1$), together with a mounting for a nonlinear impedance device 140 (e.g., a varactaor) and input and output terminal means 184 and 189, respectively. In this structure, line lengths are held to a minimum, physical distortions are practically eliminated, and complete shielding is afforded, since the passages in the rigid body can obviously all be covered with an electrically-conductive cover in practice.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Electric circuit for generating from the energy content of an electric wave having a given fundamental frequency an electric wave having a second frequency which is a harmonic higher than the second harmonic of said fundamental frequency, comprising: a first circuit loop including a branch having inductance and capacitance in series and providing resonance at said fundametal frequency, a second circuit loop including a branch having inductance and capacitance in series and providing resonance at said second frequency, a third circuit loop including a branch having inductance and capacitance in series and providing idler resonance at the second harmonic of said fundamental frequency, semiconductor diode means having a nonlinear capacitance characteristic connected in series with each of said branches and providing a common circuit path in all of said loops, input means comprising a first band-pass filter centered substantially at said fundamental frequency and including said first loop and at least one additional filter section coupled thereto to introduce a signal containing said fundamental frequency, and output means comprising a second filter centered substantially at said second frequency and including said second loop and at least one additional filter section coupled thereto to couple out a signal at said second frequency.

2. Electric circuit for generating from the energy content of an electric wave having a given fundamental frequency an electric wave having a second frequency which is a harmonic of said fundamental frequency, comprising: a first transmission-line section having an elongated outer conductor shielding an elongated inner conductor and providing resonance at said fundamental frequency, a second transmission-line section having an elongated outer conductor shielding an elongated inner conductor and providing resonance at said second frequency, means having a nonlinear impedance characteristic coupled in common across the outer and inner conductors at one end of each of said sections, a third transmission-line section having an elongated inner conductor and providing a band-pass filter section centered substantially at said fundamental frequency, means electrically coupling said first and third sections to provide an input band-pass filter, a fourth transmission-line section having an elongated outer conconductor shielding an elongated inner conductor and providing a band-pass filter section centered substantially at said second frequency, and means electrically coupling said second and fourth sections to provide an output band-pass filter.

3. Electric circuit for generating from the energy content of an electric wave having a given fundamental frequency an electric wave having a second frequency which is a harmonic of said fundamental frequency, comprising: a first transmission-line section having an elongated outer conductor shielding an elongated inner conductor and providing resonance at said fundamental frequency, a second transmission-line section having an elongated outer conductor shielding an elongated inner conductor and providing resonance at said second frequency, means having a nonlinear impedance characteristic coupled in common across the outer and inner conductors at one end of each of said sections, a third transmission-line section having an elongated outer conductor shielding an elongated inner conductor and providing a band-pass filter section centered substantially at said fundamental frequency, means electrically coupling said first and third sections to provide an input band-pass filter, a fourth transmission-line section having an elongated outer conductor shielding an elongated inner conductor and providing a band-pass filter section centered substantially at said second frequency, means electrically coupling said second and fourth sections to provide an output band-pass filter, input means coupled to the inner conductor of said third section to introduce a signal containing said fundamental frequency, and output means coupled to the inner conductor of said fourth section to couple out of said circuit a signal at said second frequency.

4. Electric circuit for generating from the energy content of an electric wave having a given fundamental frequency an electric wave having a second frequency which is a harmonic higher than the second harmonic of said fundamental frequency, comprising: a rigid structure made of electrically conductive material having first, second and third elongated hollow passages comunicating with a common hollow region in said structure at an end of each, first, second and third stiff elongated electrical inner conductors respectively supported axially within said first, second and third passages and extending to said common region, said first conductor and the walls of said first passage constituting a first circuit providing resonance at said fundamental frequency, said second conductor and the walls of said second passage constituting a second circuit providing resonance at said second frequency, said third conductor and the walls of said third passage constituting a third circuit providing idler resonance at the second harmonic of said fundamental frequency, and means having a nonlinear impedance characteristic located in said common region and coupled in common in series across all three of said circuits.

5. Electric circuit for generating from the energy content of an electric wave having a given fundamental frequency an electric wave having a second frequency which is a harmonic of said fundamental frequency, comprising: a rigid structure made of electrically conductive material having first and second elongated hollow passages communicating with a common hollow region in said structure at an end of each, first and second stiff elongated electrical inner conductors respectively supported axially within said first and second passages and extending to said common region, said first conductor and the walls of said first passage constituting a first circuit providing resonance at said fundamental frequency, said second conductor and the walls of said second passage constituting a second circuit providing resonance at said second frequency means having a nonlinear impedance characteristic located in said common region and coupled in common in series with both of said circuits, said structure having third and fourth elongated hollow passages which are electrically isolated from each other, third and fourth stiff elongated electrical inner conductors respectively supported axially within said third and fourth passages, said third conductor and the walls of said third passage constituting an input band-pass filter section centered substantially at said fundamental frequency, means coupling said input filter section with said first circuit as a second input filter section, input means coupled to said third conductor to introduce a signal containing said fundamental frequency to said input filter sections, said fourth conductor and the walls of said fourth passage constituting an output band-pass filter section centered substantially at said second frequency, means coupling said output filter section with said second circuit as another output filter section, and output means coupled to said fourth conductor to couple out of said output filter sections a signal at said second frequency.

6. Electric circuit for generating from the energy content of an electric wave having a given fundamental frequency an electric wave having a second frequency which is a harmonic higher than the second harmonic of said fundamental frequency, comprising: a rigid structure made of electrically conductive material having first, second and third elongated hollow passages communicating with a common hollow region in said structure at an end of each, first, second and third stiff elongated electrical inner conductors respectively supported axially within said first, second and third passages and extending to said common region, said first conductor and the walls of said first passage constituting a first circuit providing resonance at said fundamental frequency, said second conductor and the walls of said second passage constituting a second circuit providing resonance at said second frequency, said third conductor and the walls of said third passage constituting a third circuit providing idler resonance at the second harmonic of said fundamental frequency, means having a nonlinear impedance characteristic located in said common region and coupled in common in series across all three of said circuits, said structure having fourth and fifth elongated hollow passages which are electrically isolated from each other, fourth and fifth stiff elongated electrical conductors respectively supported axially within said fourth and fifth passages, said fourth conductor and the walls of said fourth passage constituting an input band-pass filter section centered substantially at said fundamental frequency means coupling said input filter section with said first circuit as another input filter section, input means coupled to said fourth conductor to introduce a signal containing said fundamental frequency to said input filter sections, said fifth conductor and the walls of said fifth passage constituting an output band-pass filter section centered substantially at said second frequency, means coupling said output filter section with said second circuit as another output filter section, and output means coupled to said fifth conductor to couple out of said output filter sections a signal at said second frequency.

7. Electric circuit according to claim 1 in which said first band-pass filter comprises at least three band-pass filter sections and said second filter comprises at least three band-pass filter sections.

8. A multistage broad band microwave harmonic generator in which each stage comprises an input band-pass filter comprising at least two filter sections centered at a first frequency, an output band-pass filter comprising at least two filter sections centered at a harmonic of said first frequency higher than the second harmonic, an idler loop resonant at the second harmonic of said first frequency, a varactor as a common series circuit element for said input band-pass filter, said output band-pass filter and said idler loop, and in which the output filter section of any one stage has substantially the same structural form as and is directly coupled to the input filter section of the following stage and said input band-pass filter of any one stage is resonant at the same center frequency as said output band-pass filter of the preceding stage.

References Cited by the Examiner

UNITED STATES PATENTS

| | | | |
|---|---|---|---|
| 3,025,448 | 3/1962 | Muchmore | 321—69 |
| 3,060,365 | 10/1962 | Crandell | 321—69 |
| 3,079,569 | 2/1963 | De Loach | 330—4.9 |
| 3,094,672 | 6/1963 | Lewis et al. | 330—4.9 |
| 3,108,239 | 10/1963 | Koueiter | 333—83 |
| 3,165,690 | 1/1965 | Kaufman | 321—69 |
| 3,196,339 | 7/1965 | Walker et al. | 321—69 |

FOREIGN PATENTS

| | | |
|---|---|---|
| 982,065 | 2/1965 | Great Britain. |

OTHER REFERENCES

1959 International Solid State Conference, Digest of Technical Papers—Solid State Microwave Electronics II, Feb. 13, 1959, pp. 82–84.

The Microwave Journal, Wideband Single-Diode Parametric Amplifiers, February 1962, pp. 99–106.

JOHN F. COUCH, *Primary Examiner.*

LLOYD McCOLLUM, Examiner.

J. J. KISSANE, G. GOLDBERG, *Assistant Examiners.*